United States Patent [19]

Larsson et al.

[11] 4,097,787
[45] Jun. 27, 1978

[54] DEVICE FOR CONTROLLING THE PERIPHERAL SPEED IN ROTATING OBJECTS

[75] Inventors: Lars-Göran Larsson; Frede Sörensen, both of Vesteras, Sweden

[73] Assignee: Asea AB, Vasteras, Sweden

[21] Appl. No.: 694,439

[22] Filed: Jun. 9, 1976

[30] Foreign Application Priority Data

Jun. 17, 1975 Sweden .................................. 7506926

[51] Int. Cl.² ............................................. H02P 5/00
[52] U.S. Cl .................................. 318/332; 51/134.5R
[58] Field of Search ............... 318/432, 395, 558, 161, 318/332, 393, 394, 396, 397, 433, 571, 632, 301; 51/134.5, 165.92, 327

[56] References Cited

U.S. PATENT DOCUMENTS 3,704,556  12/1972  Nedreski ............................. 318/332
3,941,987   3/1976  Tack, Jr. ............................. 318/571

Primary Examiner—Robert K. Schaefer
Assistant Examiner—Michael K. Mutter
Attorney, Agent, or Firm—Kenyon & Kenyon, Reilly, Carr & Chapin

[57] ABSTRACT

In order to control the peripheral speed of a rotating object, such as a grinding wheel, the current of the motor driving the grinding wheel is periodically integrated during a deceleration and an acceleration to obtain a composite signal from the integrator which reflects the necessary change in speed due to the decrease in diameter of the grinding wheel, which correction signal is combined with a signal representing a control input for a maximum size and supplied to the controller for the grinding wheel motor.

14 Claims, 2 Drawing Figures

DEVICE FOR CONTROLLING THE PERIPHERAL SPEED IN ROTATING OBJECTS

BACKGROUND OF THE INVENTION

This invention relates to the control of peripheral speed in rotating objects such as motor driven grinding wheels in general and more particularly to such a device which is capable of controlling the rotational speed to maintain a constant peripheral speed as the diameter of the device changes.

When controlling rotating objects, such as grinding wheels, there is a problem in that the exact diameter of the wheel as it becomes worn down is not known. In a machine such as a grinding machine for grinding slabs and so on before rolling, in order to remove scales and cracks, high speed grinding results in a optimal, economical method. However, there is a maximum peripheral speed which should not be exceeded for safety. Furthermore, it is desirable to have a constant peripheral speed since the grinding effect increases with speed. Thus, to maintain accurate grinding a constant speed is important. However, even with constant speed, there is a certain peripheral speed, which depends on diameter, which should not be exceeded.

Various means have been used to carry out speed control in such devices. For example, contact measurements can be used. However, such a measurement involves complex apparatus and often results in considerable inaccuracy in measuring. It is also known to perform such measuring photoelectrically and use the measured signals for control. However, such a system only operates satisfactorily under ideal conditions. The problems involved with optical measuring devices in the environment of a grinding wheel generating considerable dust and particles is evident. It should be noted that although the present invention is explained in terms of a grinding wheel, that is its equally applicable to other devices of similar nature where a constant peripheral speed which does not exceed a safe speed is to be maintained.

In view of the problem and difficulty with prior art solutions to it, the need for an improved method and apparatus for maintaining a constant peripheral speed in a device such as a grinding wheel becomes evident.

SUMMARY OF THE INVENTION

The present invention provides a solution to this problem. Basically, the supplied moment or current of the device, e.g., the grinding motor, is time integrated in an integrator for a certain period of time, partially during a deceleration and partially during a acceleration. The composite signal obtained from the integrator is supplied to a function generator in which it is processed to provide an output signal which is used to control the speed of rotation of the object. The integration over a period of time makes possibles the complete or partial elimination of full load losses by combining the losses during deceleration with those during acceleration and thus obtains a measurement which compensates for these losses. In accordance with the present invention, an initial adjustment of the speed is made and a composite signal obtained and that signal then used for a certain period of time, for example, one minute or fifteen minutes, depending on the type of object used and the operating conditions. The signal thus obtained operates as the control signal over this period, the signal being stored. After the predetermined interval, a new calibration is carried out with a deceleration and acceleration and a new control signal obtained. In accordance with the present invention, optimum elimination of losses is obtained by choosing the time interval for deceleration and acceleration to be be equal.

DETAILED DESCRIPTION OF THE PREFERRED EMBODIMENT

When it is desired to generate a control signal for the device which is to be driven at constant speed, such as a grinding wheel, the supplied moment or supplied current is time integrated under a constant deceleration and acceleration. The relationship of the various quantities in a d.c. drive motor is $M = k \cdot \phi \cdot I = k \cdot I_m \cdot I$ where $k$ is a machine constant, $\phi$ is the flux, $I_m$ the excitation current and $I$ the armature current. If $I_m$ is held constant by field current control, which is done in the apparatus of the present invention, M is proportional to I. Thus, it is possible to obtain a signal proportional to the moment by measuring the armature current I. Furthermore, in principle, the losses can be regarded to be the same in the case of deceleration as in acceleration. Furthermore, by choosing a short time interval for deceleration as well as acceleration, a constant deceleration and acceleration, i.e., straight curves with constant slope, can be obtained.

Figure 1:
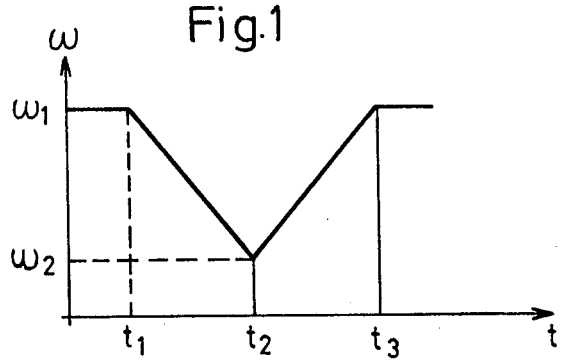
FIG. 1 is a drawing of curves helpful in understanding the principle of operation of the present invention.
Figure 1:
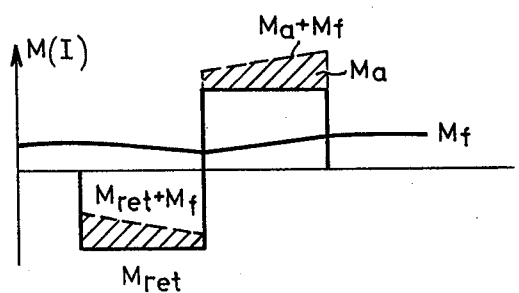

FIG. 1 plots angular rotational speed $\omega$ with respect to time on the top curve. As is well known, $\omega = v/r$ where $v$ is the peripheral speed and $r$ the radius. As illustrated by FIG. 1, the device starts out with an angular speed of $\omega_1$. Between times $t_1$ and $t_2$ deceleration takes place down to an angular speed of $\omega_2$. Between the time $t_2$ and $t_3$ acceleration from the minimum speed $\omega_2$ to the maximum speed of $\omega_1$ takes place. From this the following relationship is obtained:

$$\left| \frac{d\omega}{dt} \right|_{mean} = 2 \cdot \frac{\omega_1 - \omega_2}{t_3 - t_1}$$

The relationship with regard to the mean moment is as follows:

$$M_{mean} = \frac{-1}{t_2 - t_1} \int_{t_1}^{t_2} (M_{ret} + M_f) \, dt + \frac{1}{t_3 - t_2} \int_{t_2}^{t_3} (M_a + M_f) \, dt$$

where $M_{ret}$ is the moment during retardation, $M_a$ the acceleration moment and $M_f$ the loss moment.

If $(t_2 - t_1) = (t_3 - t_2)$, compensation will be obtained for $\int M_f \cdot dt$. The basic moment of inertia is:

$$J_o = \frac{M_{mean}}{\left| \frac{d\omega}{dt} \right|_{mean}}$$

From the lower curve of FIG. 1 it is evident that in the deceleration case, the curve $M_{ret}$ is reduced by $M_f$ while in the acceleration case the curve $M_a$ is increased by $M_f$. The areas underneath the curve which are cross sectioned and enclosed by dashed lines are equally large but with opposite signs. Through intergration over equal time intervals during acceleration and deceleration, elimination of these losses is obtained. The following functional relationships apply:

$$J(r) \cdot \frac{d\omega}{dt} = \frac{M_{ret} + M_a}{2} \quad (1)$$

$$v = \omega \cdot r \quad (2)$$

where $J(r)$ is the moment of inertia for the radius $r$.

Thus, the torque or current requirements of the system for deceleration and acceleration, excluding the portion of the driven object whose diameter is variable are introduced in a counteracting manner during time integration. This is done in such a way that deceleration and acceleration of the complete system including the part which has a variable diameter result in the fact that the measured torque and current time intergral for constant deceleration and acceleration correspond only to the portion of the driven object whose diameter is variable as illustrated by equation (1).

As will be more fully evident below, the parts of the oscillating masses which have no connection with the diameter dependence are separated and a corresponding opposite signal introduced, so that these parts are excluded from the control, making the system become more sensitive to variations in diameter. The control signal will thus have a degree of accuracy which gives accurate control for constant peripheral speed. By repeating the signal after, for example, every 15 minutes in the case of a grinding wheel, a good control of the peripheral speed as a diameter reduction occurs with the wheel wearing down is obtained.

Figure 2:
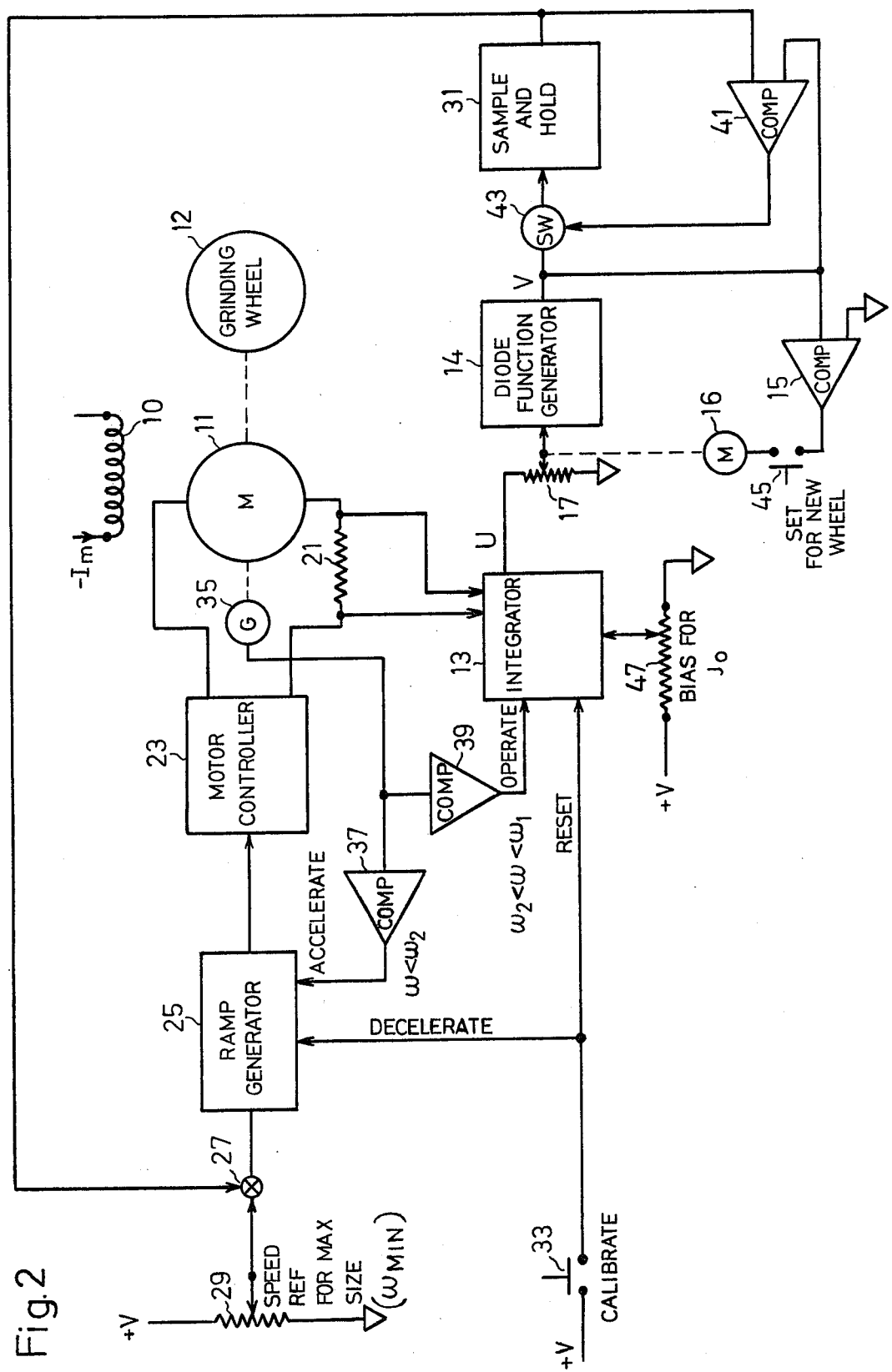
FIG. 2 is a block-circuit diagram of apparatus for carrying out the present invention.

FIG. 2 is a block-circuit diagram of the system of the present invention. Illustrated on FIG. 2 is a d.c. motor 11 having a separate field excitation 10 with a current $I_m$. The motor 11 drives a grinding wheel 12 whose peripheral speed is desired to be maintained constant as it is worn down. Inserted in the motor armature lead is a resistor 21 used to measure the armature current to give an indication of torque. The measured current at the resistor 21 is provided as an input to an integrator 13.

The motor 11 is driven by a motor controller 23 which obtains its input from a ramp generator 25 which is supplied with a voltage obtained at a summing junction 27. At this junction is summed a fixed voltage from a potentiometer 29 representing the speed reference for maximum wheel size or, in other words, the minimum angular rotational speed and a correction signal to compensate for a reduction of diameter which is supplied from a sample and hold circuit 31. The sample and hold circuit obtains its input from a diode function generator 14, the input of which is provided through a potentiometer 17 from the integrator 13. During normal operation, i.e., while not calibrating, the value stored in the sample and hold circuit 31 is combined with the value from the potentiometer 29 through the ramp generator 25, which will be at its maximum, to provide a signal to the motor controller to regulate the speed.

To carry out calibration, a switch 33 is depressed. This switch resets the integrator 13 and also commands the ramp generator to generate a down-going signal to result in a decrease of speed in the manner illustrated on FIG. 1. The integrator, which has been reset, begins integrating the current. Coupled to the motor 11 is a tachometer generator 35, the output of which is coupled to a comparator 37 which senses when the speed corresponding to $\omega_2$ on FIG. 1 is reached, at which point the ramp generator is commnanded to accelerate again. The output of the tachometer generator is also provided to a comparator device 39 which provides an enabling output for the integrator enabling it to integrate only when the speed is between the limits $\omega_1$ and $\omega_2$. The integration thus obtained is coupled through a potentiometer 17, which is used for setting up constants associated with a given type of wheel in a manner to be explained below, to a diode function generator 14, the output of which is then coupled into the sample and hold circuit 31. The output of the sample and hold circuit 31 is also coupled to a comparator 41 having at its other input the output of the diode function generator 14. If the output therefrom differs from the stored signal previously obtained then updating is not carried out. In other words, this is an indication that a bad calibration was obtained. The output of the comparator is thus used to control a switch 43 at the input to the sample and hold to cause it to be updated or not to be updated. The output of the diode function generator is also coupled to an additional comparator 15 having as a reference input zero voltage. The comparator output is coupled through a switch 45 to a motor 16 which drives the wiper on the potentiometer 17. This is used for setting up a new wheel. With a new wheel installed, the result of the integration after the signal is passed through the diode function generator should be zero. If it is not, the comparator 15 drives the motor 17 until zero is reached. The integrator 13 also has an additional input from a potentiometer 47 which provides a bias for $J_O$.

The manner in which the system operates will now be explained in more detail.

The required additional angular speed which is needed to maintain the peripheral speed constant in the driven object 12 of FIG. 2, e.g., a grinding wheel, as its diameter is reduced because of wear can be calculated starting with the following relationship:

$$(J_O + J) \cdot \frac{d\omega}{dt} = M_a + M_f = m_{O1} + m_1 - (m_{fO} + m_{f1})$$

where $M_a$ is the total torque during acceleration, $M_f$ the total torque loss, $M_{O1}$ the partial torque excluding the driven object and $M_{fO}$ the corresponding loss torque. Similarly, $M_1$ and $M_{f1}$ are the corresponding partial torques for the driven object. The corresponding expression for retardation is as follows:

$$(J_O + J) \cdot \frac{d\omega}{dt} = M_{ret} + M_f = m_{O2} + m_2 - (m_{fO} + m_{f2})$$

The constant moment of inertia $J_O$ of the system (exclusive of the moment of inertia of the driven object, e.g., the grinding wheel) includes the drive system, its transmissions and fastening devices and such reinforcements in the driven object which cannot be said to correspond to the homogeneous structure thereof.

The moment of inertia $J_O$ can be determined by carrying out a separate measurement during deceleration and acceleration without the driven object. This results in the equation:

$$J_O \cdot \frac{d\omega}{dt} = \frac{m_{O1} + m_{O2}}{2} \quad (1)$$

This term then is introduced as a constant bias term by the potentiometer 47 of FIG. 2. Thus, subsequent measurements during retardation and acceleration with the driven object form the expression:

$$J \cdot \frac{d\omega}{dt} = \frac{m_1 + m_2}{2} \quad (2)$$

The above equations (1) and (2) apply where the load terms (friction, air resistance, etc., in the system) are eliminated during the measurements during deceleration and acceleration. This is a condition which applies with a great deal of accuracy since the torque terms are integrated during the measurement within a short time interval. The measurement processes thus take place with integration of the torque terms in the speed intergral $\omega_1 - \omega_2$ during the times $t_1 - t_3$ which is realized through a controlled and a constant deceleration and acceleration respectively. In addition, the machine constant $k$ mentioned above for the drive system is controlled and maintained constant during the measuring process, e.g., a controlled and constant field current in the field winding 10 of the motor 11 is maintained. Under these conditions, the following relationship applies:

$$(J_O + J) \sim (I_1 + I_2) = (i_{10} + i_{20}) + (i_1 + i_2)$$

where $i_{10}$ and $i_{20}$ are the partial currents for the portion of the object which is not diameter dependent during acceleration and deceleration, respectively, and $i_1$ and $i_2$ the corresponding partial currents for the portion of the object which is diameter dependent. Thus, $$J_0 \sim (i_{10} + i_{20})$$

$$J \sim (i_1 + i_2) = I_1 + I_2 - (i_{10} + i_{20}) \sim U$$

where $U$ is the output signal from the integrator 13.

The moment of inertia J varies with the radius of the driven object in accordance with the following:

$$J \sim r^4 \sim U \quad (3)$$

provided that the driven object 12 is a homogeneous cylinder with plane-parallel sides. In order to maintain the peripheral speed of the driven object constant, its speed $\omega$ must vary with its radius in accordance with the relationship $\omega \sim 1/r$ within the interval $r_{max} > r > r_{min}$. The desired additional speed which is required because of a radius reduction from $r_{max}$ is formed from the expression $$\frac{\omega - \omega_{min}}{\omega_{min}} = \frac{(r_{max} - 1)}{r}$$

where, in accordance with equation (3)

$$\frac{(r_{max})^4}{r} = \frac{1}{U}$$

that is, $$\frac{\omega - \omega_{min}}{\omega_{min}} = \sqrt[4]{\frac{1}{U}} - 1 \quad (4)$$

for $$1 > U > U_{min}$$

and $$\omega_{min} < \omega < \omega_{max}$$

Thus, it is possible to obtain the correction or additional speed term required from the expression of equation (4) by performing the necessary computation using the diode function generator. The quantity U is the signal obtained in the integrator by measuring the current supply to the drive system, which is required to retard and accelerate only the moment of inertia of the driven object.

With the development of these equations in mind, the operation of the system of FIG. 2 can be better understood. In setting up the system, operation is first carried out without the driven object to determine the bias to be set in the potentiometer 47 for $J_O$. In other words, the system must be operated through an acceleration and deceleration and $J_O$ set so that integrator output is 0 for this condition. Once this is set up, a new wheel 12 is put in place. The speed reference potentiometer 29 is set to give the desired rotational and peripheral speed for the maximum size wheel. With the maximum size wheel the output of the diode function generator after integration should be zero. Thus, the calibration switch 33 is pressed, resetting the integrator and causing the ramp generator to begin a deceleration. A deceleration is carried out and then an acceleration, the switch over from acceleration to deceleration being commanded by the comparator 37. As soon as the speed drops a slight bit below the speed $\omega_1$, the comparator 39 enables the integrator, which carries out the integration between times $t_1$ and $t_3$ shown on FIG. 1. The integrator stops integrating as soon as the speed $\omega_1$ is reached. Now stored in the integrator is a value U. This value is coupled through the potentiometer 17 to the diode function generator which has an output V. V should be zero. V is checked in the comparator 15 with the switch 45 depressed and the comparator provides an output to the motor 16 which causes it to drive the wiper on potentiometer 17 until the diode function generator output is zero. Now the system is set up for operation. Grinding is carried out and the wheel is worn down. After a predetermined time such as 15 minutes, the operator again presses the calibrate switch 33. Integration is carried in the manner described above with a new signal U residing in the integrator upon the completion thereof. This signal is coupled through the potentiometer 17 to the diode function generator which is programmed to carry out the equation (4) given above. This output is provided to the comparator 41 where it is compared with the previously stored signal in sample and hold circuit 31 (in this case zero, since there was previously no correction with the maximum size wheel present). As long as it does not deviate substantially from the previous value, the switch 43 is closed by the comparator and the new value stored in the sample and hold circuit 31. This value is provided back to the summing junction 27 where it is added to the output of the potentiometer 29 to provide a new signal, through the ramp generator 25, to the motor control 23. Operation continues and again after the predetermined period, e.g., 15 minutes, the calibrate button is again pressed and the process repeated with a new value U and new value V generated and the value V stored in the sample and hold circuit 31 as long as it does not deviate too much from the previous value, i.e., does not indicate that an erratic measurement was made. The switch 43 is arranged such that when receiving an output from the comparator 41 indicating an erratic measurement, zero is loaded into the sample and hold circuit so that the speed is reduced to the minimum speed for a full size wheel. This provides a safety factor preventing exceeding the maximum safe speed should an error in measurement take place.

Thus, an improved system for maintaining the peripheral speed of an object such as a grinding wheel constant as it is worn down has been shown. Although a specific embodiment has been illustrated and described, it will be obvious to those skilled in the art that various modifications may be made without departing from the spirit of the invention which is intended to be limited solely by the appended claims.

We claim:

1. A method for controlling the peripheral speed of a rotating object, driven by a driving system including an electric motor, which is subject to wear comprising the steps of:
   (a) generating a first signal representing a speed reference for a size of the rotating object before any wear occurs and at which the angular rotation rate will be a minimum;
   (b) measuring a quantity proportional to the torque of the motor driving the object;
   (c) decelerating and accelerating the object over equal predetermined times of deceleration and acceleration;
   (d) integrating the quantity proportional to torque over the equal times of deceleration and acceleration in an integrator to obtain a second signal at the output of the integrator which has eliminated therefrom the loss moment;
   (e) coupling said second signal through a function generator to convert it into a third signal representative of the increase in the speed necessary to compensate for wear; and
   (f) using the sum of said first signal and third signal as a control input to the motor driving the rotating object.

2. The method according to claim 1 and further including the step of carrying out an integration without the drive object connected to the motor to obtain a signal from said integrator which is representative of the moment of inertia of said driving system without the driven object and providing said signal to said integrator as a negative bias during subsequent integrations with said driven object attached thereby increasing the sensitivity of the system to variations in the diameter of said driven object.

3. The method according to claim 1 and further including the step of scaling the output of the integrator which is provided to said function generator to take into account the density and width of the driver object.

4. The method according to claim 1 and further including the step of comparing the output of the function generator with a stored previous output thereof and storing said output for use as a control signal only if it falls within predetermined limits of the previous output signal.

5. Apparatus for controlling the peripheral speed of a motor driven rotation object which is subject to a change in diameter, said motor obtaining inputs from a motor controller, the motor controller receiving a speed reference input representing a desired rotational peripheral speed comprising:
   (a) means for measuring a quantity proportional to the torque of the motor;
   (b) means for carrying out a controlled deceleration and acceleration of the driven object having an output coupled to said motor controller;
   (c) an integrator for integrating the measured quantity proportional to torque during said acceleration and deceleration to develop a first signal bearing a known relationship to said driven object;
   (d) a function generator having said first signal as an input and converting said signal to a second signal representing the additional incremental angular speed required to be added to a reference speed for a maximum size of the object without wear to maintain a constant peripheral speed;
   (e) generating a third signal representing said reference speed for maximum size; and
   (f) adding said second signal and said third signal and providing the result as an input to the motor controller.

6. Apparatus according to claim 5 and further including means for providing to said integrator a negative bias signal representative of system operation without said driven object whereby said integrator will be more sensitive to changes in diameter of said driven object.

7. Apparatus according to claim 5 and further including a sample and hold circuit coupled to the output of said function generator, the output of said sample and hold circuit being provided as said signal representing a desired speed.

8. Apparatus according to claim 7 and further including a comparator for comparing the output of said sample and hold circuit representing a previous speed command with the output of said function generator and a switch between said function generator and sample and hold circuit having its control input coupled to the output of said comparator, said comparator arranged to provide an output to close said switch to couple said function generator and sample and hold circuit only when the value from said function generator is within predetermined limits with respect to the signal previously stored in said sample and hold circuit.

9. Apparatus according to claim 7 and further including scaling means interposed between said integrator and function generator for adjusting the output signal of said integrator to take into account the density and width of the driven object.

10. Apparatus according to claim 5 wherein said driven object is a grinding wheel.

11. Apparatus for controlling the peripheral speed of a driven rotating object which is subject to a change in diameter, said driven object being driven by a motor obtaining inputs from a motor controller, the motor controller receiving a speed reference input representing a desired rotational speed comprising:
   (a) a ramp generator having at its input a summing junction and providing its output to the motor controller;

(b) a reference speed potentiometer set to provide a desired speed for a object of maximum diameter providing a first input to said summing junction;

(c) means to measure the armature current of the motor;

(d) an integrator having the output of said means to measure as an input;

(e) a diode function generator having its input coupled to the output of said integrator and having its output coupled as a second input to said summing junction; and (f) means to cause said ramp generator to provide a signal to said motor controller which results in first a deceleration and then acceleration, said means also causing said integrator to integrate its input signal over the period of said deceleration and acceleration.

12. Apparatus according to claim 11 and further including means to provide an offset bias to said integrator to take into account the signal which would be obtained without a grinding wheel.

13. Apparatus according to claim 12 and further including scaling means interposed between said integrator and diode function generator comprising: a potentiometer; a motor for driving said potentiometer; a comparator having as a first input the output of said diode function generator and as a second input a voltage of zero and adapted to provide an output when said first input deviates from said second input; a switch between the output of said comparator and said motor.

14. Apparatus according to claim 11 and further including a sample and hold circuit; a switch coupling the output of said diode function generator to said sample and hold circuit, the output of said sample and hold circuit being the second input to said summing junction; and a comparator having as one input the output of said diode function generator and a second input the output of said sample and hold circuit, the output of said comparator being coupled as a control input to said switch.

* * * * *